United States Patent [19]

Smetana

[11] 4,273,241

[45] Jun. 16, 1981

[54] REFLECTOR UNIT FOR PHOTOFLASH ARRAY

[75] Inventor: Andrew Smetana, Mentor, Ohio

[73] Assignee: General Electric Company, Schenectady, N.Y.

[21] Appl. No.: 54,776

[22] Filed: Jul. 5, 1979

[51] Int. Cl.³ .................... B65D 21/02; G03B 15/02
[52] U.S. Cl. ..................................... 206/520; 362/11
[58] Field of Search ............... 206/518, 519, 520; 362/11

[56] References Cited

U.S. PATENT DOCUMENTS

| | | | |
|---|---|---|---|
| 3,131,845 | 5/1964 | Sherlock | 206/520 |
| 3,416,695 | 12/1968 | Bessett | 206/520 |
| 3,440,988 | 4/1969 | Bremer | 206/520 |
| 3,469,686 | 9/1969 | Gatsche | 206/518 |
| 3,589,511 | 6/1971 | Britt | 206/518 |
| 4,133,023 | 1/1979 | Hanson . | |

Primary Examiner—George E. Lowrance
Attorney, Agent, or Firm—Norman C. Fulmer; Lawrence R. Kempton; Philip L. Schlamp

[57] ABSTRACT

A reflector unit is shaped from a plastic sheet to provide a plurality of individual reflectors having raised radiation barriers between adjacent reflectors. Ribs are provided in the radiation barriers to prevent stacked reflector units from sticking together during manufacture of flash arrays. Downwardly extending cups are formed in a central area of the reflector unit to aid in the handling of stacked reflector units.

6 Claims, 3 Drawing Figures

U.S. Patent    Jun. 16, 1981    4,273,241
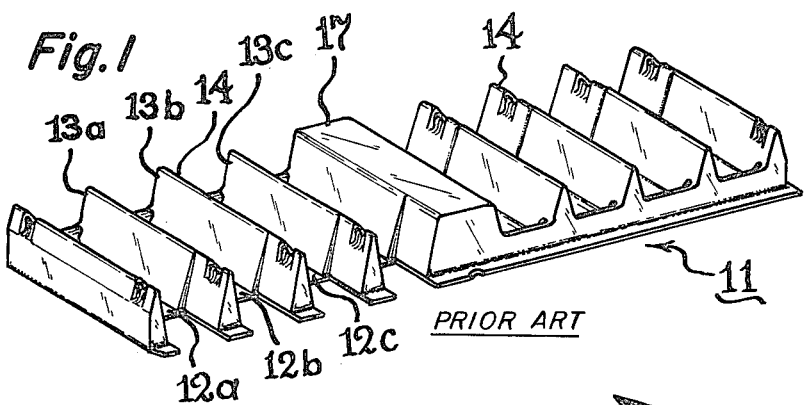
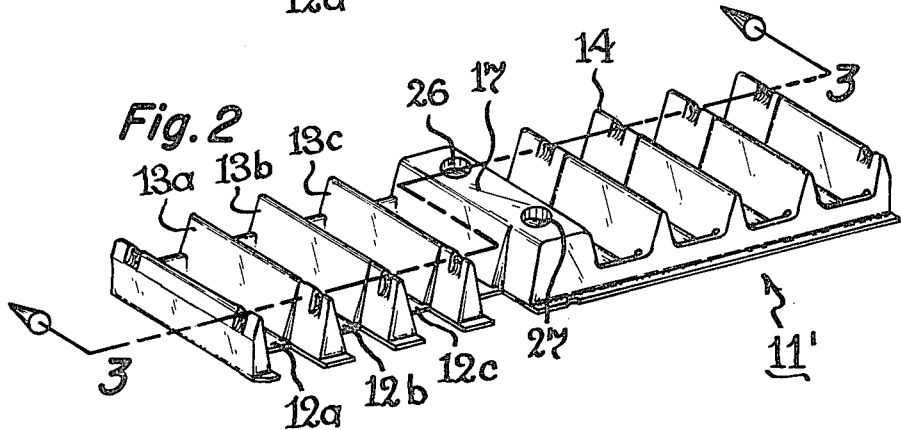
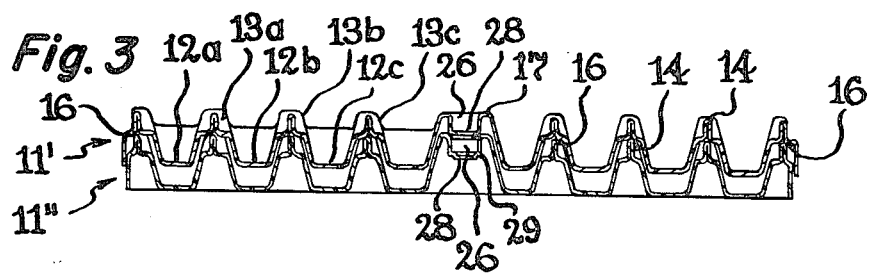

REFLECTOR UNIT FOR PHOTOFLASH ARRAY

CROSS-REFERENCE TO RELATED APPLICATION

Ser. No. 54,834, filed July 5, 1979, Edward L. Latos and Elton G. Moneymaker, "Reflector Unit for Photoflash Array" assigned the same as this invention.

BACKGROUND OF THE INVENTION

The invention is in the field of photoflash arrays. U.S. Pat. No. 4,133,023 to Hanson discloses a photoflash array, of the Flip Flash type, having a reflector unit configured to provide a plurality of individual reflectors having raised radiation barriers between adjacent reflectors to prevent "sympathetic" flashing of lamps due to heat and/or light from an adjacent flashing lamp. An economical way of manufacturing the reflector units is to pressure-form heated plastic sheet material, such as with a mold and a vacuum and/or air pressure. The reflector unit is generally rectangular, and the individual reflectors and radiation barriers are transversely oriented along the length of the unit. The radiation barriers have a tapered configuration so that the reflector units can be stacked in a nested manner for compact storage prior to being used in manufacturing flash arrays. Some manufacturing difficulties have been incurred due to the stacked reflector units sometimes sticking together so tightly, because of the nested tapered radiation barriers, that it is difficult to remove the top unit, such as by a vacuum lifting arm, for positioning it into a flash array. The above-referenced patent application discloses and claims a solution to this problem, in the form of ribs provided in the rear concavities of the radiation barriers.

SUMMARY OF THE INVENTION

A principal object of the invention is to provide improved reflector units for photoflash arrays, and to facilitate and improve the manufacturing process.

The invention comprises, briefly and in a preferred embodiment, a reflector unit for a photoflash array, shaped from a plastic sheet to provide a plurality of individual reflectors having raised tapered radiation barriers between adjacent reflectors. Downwardly extending cups are formed in a flat central area of the reflector unit so as to permit nested stacking of the reflector units and at a same time helping to prevent sticking together of the stacked units. The bottom regions of the cups are given a reduced diameter so that these bottom regions fit into the top regions of the cups in the next lower reflector unit of a nested stack of units, and the flanges of the cup bottom regions are on or near the flat central area of the lower reflector unit, to provide accurately aligned vertical stacking of the reflector units and facilitate accurate positioning and lifting of each succeeding top reflector unit by a vacuum device applied to the flat central area, which device positions each reflector unit in a flash array.

BRIEF DESCRIPTION OF DRAWING

FIG. 1 is a perspective view of a prior art reflector unit.

FIG. 2 is a perspective view of a preferred embodiment of the invention.

FIG. 3 is a cross-sectional view taken on the line 3—3 of FIG. 2.

DESCRIPTION OF THE PREFERRED EMBODIMENT

The reflector unit 11 is generally the same, and for the same purpose, as the reflector unit 41 in the above-referenced Hanson patent which is incorporated herein by reference. The reflector unit 11 is generally rectangular and is made from a thin sheet of plastic shaped to provide a plurality of transversely positioned individual reflectors 12a, 12b, 12c, etc., and transversely positioned raised radiation barriers 13a, 13b, 13c, etc. are respectively provided between adjacent individual reflectors. The reflector unit 11 is made by a pressure-forming technique in which a sheet of heated plastic is placed over a mold and air pressure is applied over the plastic and/or vacuum is applied between the plastic and the mold, so as to pull down portions of the plastic sheet into mold cavities to form the individual reflectors 12a etc., and at the same time forming the radiation barriers 13a, etc. The radiation barriers 13a, etc. are shaped so as to taper divergently from their front apexes 14, as shown. This facilitates the pressure forming of the reflector unit, and also facilitates removal of the shaped reflector unit from the mold. The tapered shapes of the radiation barriers also function as part of the individual reflectors, and help in the forward reflecting of light from lamps when flashed, there being a flash lamp in each individual reflector in a completed unit, as disclosed in the above-referenced Hanson patent. Preferably the reflector unit is made from white plastic material.

As is disclosed and claimed in the above-referenced patent application, ribs 16 or webs are formed in the concave back sides of at least some of the radiation barriers near their apexes 14, so that when a plurality of reflector units 11 are stacked in nested manner, as shown in FIG. 3, the ribs 16 of each reflector unit rests on apexes 14 of radiation barriers of the reflector unit beneath. This prevents the above-described undesirable wedging together and sticking together of adjacent reflector units, and thus facilitates stacking and nesting of reflector units for storage and for their placement into flash assemblies, and permits automatic equipment, such as vacuum arms, to readily lift reflector units from the top of the stack and place them in flash assemblies. The vacuum lifting may be applied to a flat area 17 of the unit.

The ribs 16 are readily formed during pressure forming of the reflector units, by providing notches in the forming mold; the pressure forming of the reflector unit also forms the ribs 16, and in so doing forms corresponding grooves 18 on the sides of the apexes 14 of the radiation barriers 13a, etc. In a preferred embodiment, two ribs 16 are provided in each of the end barriers 19, 20, and one rib 16 is provided in each remaining barrier.

The webs 16 are formed, during the pressure-forming step, by forcing together small areas of plastic on opposite sides of the radiation barrier near its apex, thus forming webs transverse to the apexes. The webs 16 should preferably be sufficiently narrow, such as 0.08 inches wide, so that the plastic material does not break away to form cracks or holes at the web edges.

In accordance with the present invention, the front flat central area 17 of the reflector unit is provided with one or more cup-like depressions 26, 27 extending toward the rear of the unit. The bottom regions 28 of the depressions 26, 27 have a reduced diameter so as to fit within the top regions of the cups in the next lower reflector of a nested stack of reflectors, as shown in FIG. 3. The outer diameter of the bottom regions 28 is approximately the same as the inner diameter of the cups 26, 27. This nesting of the cups insures accurate vertical alignment of the stacked reflectors and thus improves the accuracy of positioning the reflector units into flash arrays by a vacuum lifting mechasnism which may comprise a pair of rubber suction cups on a hinged lifting arm; the suction cups are applied to the flat top center area 17 of the top reflector unit of the stack, around the respective alignment cups 26, 27. Preferably the alignment cups 26,27 are dimensioned so that the flanges 29 at the reduced-diameter bottom regions 28 rest on or are near the flat center area 17 of the next lower reflector unit, so that the center area 17 will not be appreciably distorted by the slight downward pressure of the vacuum lifter when it makes initial contact with the reflector unit.

While preferred embodiments of the invention have been shown and described, various other embodiments and modifications thereof will become apparent to persons skilled in the art, and will fall within the scope of the invention as defined in the following claims.

What I claim as new and desire to secure by Letters Patent of the United States is:

1. A reflector unit for assembly into a photoflash array, comprising a sheet-like member shaped to provide a plurality of individual reflectors and having a substantially flat front surface area between two of said individual reflectors, said reflector units being contoured so that a plurality thereof can be stacked in nested manner, said flat surface area being intended to function as an area to which a vacuum device is applied for successively lifting the uppermost reflector units from the stack thereof, wherein the improvement comprises one or more cup-like depressions formed in said front surface area and extending rearwardly, said cup-like depressions being shaped to have an end region of reduced diameter and a flange connecting said end region to the next of the depression, and dimensioned so that when a plurality of said reflector units are stacked the reduced diameter end regions will fit into the cup-like depressions of an adjacent reflector unit and the flanges will be near or against the flat front surface area of said adjacent reflector unit, thereby improving the stacking alignment and also preventing said flat surface area from being appreciably distorted when said vacuum lifting device is applied thereto.

2. A reflector unit as claimed in claim 1, in which said cup-like depressions are cylindrical and the outer diameters of said end regions are approximately the same as the inner diameters of the depressions.

3. A reflector unit as claimed in claim 2, having a generally rectangular shape, said flat front surface area being at the center of the front side of the unit.

4. A reflector unit as claimed in claim 3, having a pair of said cup-like depressions aligned transversely to the length of the unit.

5. A reflector unit as claimed in claim 1 or claim 4, shaped to have a plurality of tapered radiation barriers respectively between adjacent individual reflectors, and one or more ribs formed in the concavity and near the apex of one or more of said radiation barriers so as to permit nested stacking of a plurality of said reflector units and prevent adjacent reflector units from wedging together.

6. A reflector unit as claimed in claim 1, in which said sheet-like member is a white plastic material.

* * * * *